United States Patent [19]

Hassell et al.

[11] Patent Number: 4,935,080
[45] Date of Patent: Jun. 19, 1990

[54] PROTECTION AND BONDING OF NEODYMIUM-BORON-IRON MAGNETS USED IN THE FORMATION OF MAGNET ASSEMBLIES

[75] Inventors: Gavin G. Hassell, Blacksburg; Kevin E. Layne, Christiansburg; John H. Mabie, Radford; Daniel H. Snuffer, Christiansburg, all of Va.

[73] Assignee: Kollmorgen Corporation, Simsbury, Conn.

[21] Appl. No.: 295,371

[22] Filed: Jan. 11, 1989

Related U.S. Application Data

[63] Continuation-in-part of Ser. No. 149,728, Jan. 29, 1988, abandoned.

[51] Int. Cl.$^5$ ............................................. B32B 31/00
[52] U.S. Cl. ....................................... 156/154; 29/596; 156/153; 156/280; 156/281; 156/319; 156/330; 310/154; 310/272; 335/302; 335/303; 427/127
[58] Field of Search ............... 156/153, 319, 280, 330, 156/281, 154; 29/596; 335/302, 303; 310/154, 272; 427/127

[56] References Cited

U.S. PATENT DOCUMENTS

| | | | |
|---|---|---|---|
| 2,774,701 | 12/1956 | Koryta | 156/319 |
| 4,141,137 | 2/1979 | De Wolf et al. | 310/154 |
| 4,464,595 | 8/1984 | Hamano et al. | 29/596 |
| 4,748,738 | 6/1988 | Nayar | 29/596 |

FOREIGN PATENT DOCUMENTS 58-103863  6/1983  Japan .................................. 29/596

Primary Examiner—John J. Gallagher
Attorney, Agent, or Firm—Morgan & Finnegan

[57] ABSTRACT

A method of preparing corrosion resistant neodymium-boron-iron magnets is provided. The cleaned magnet is coated with zinc phosphate which neutralizes surface effects of contaminants and rinsed with chromic acid. A relatively large surface area having numerous mechanical interlocking sites receptive to adhesives and coatings is obtained. In one embodiment a durable, corrosion-resistant coating such as amide imide or specially formulated zinc-or chromium-rich epoxy primer is applied to the zinc phosphate coated magnet. This can be bonded to a substrate using a suitable adhesive. A flexible epoxy adhesive is used for bonding motor field assemblies.

28 Claims, 1 Drawing Sheet

PROTECTION AND BONDING OF NEODYMIUM-BORON-IRON MAGNETS USED IN THE FORMATION OF MAGNET ASSEMBLIES

This application is a continuation-in-part of Ser. No. 149,728 filed Jan. 29, 1988, now abandoned.

BACKGROUND OF THE INVENTION

The present invention relates to protecting neodymium-boron-iron magnets and to protecting and bonding such magnets in assemblies, especially motor field assemblies.

Neodymium-boron-iron magnets have recently found various applications, for example, in electric motor field assemblies. They are, however, highly susceptible to corrosion and oxidation. The heavy corrosion observed with Nd-Fe-B alloys can proceed up to a complete pulverization of sintered or compacted bodies.

Oxidation protection of Nd-Fe-B magnets has included modification of the alloy elements and use of chloride free powders and various coatings including aluminum vapor deposit, titanium nickel, and epoxy. It is reported that most metallic coatings, including aluminum, copper, cadmium, nickel, and titanium nickel exhibited depletion from the surface after being kept, even in air, for a couple of years. Some epoxy coated magnets exhibited excellent corrosion resistance. Liquid epoxies, as opposed to conventional solid types, permit a rapid solubilization of the chromate molecules when chromate-rich primers are used. This causes corresponding blisters when topcoated and subsequent failure during hot water or humidity tests. When the sacrificial chromate is omitted, blistering does not occur; however, corrosion resistance is unacceptable. Other coating problems include permeability of the coating and chemical reaction between the magnet and the coating.

It has been found that coatings and processes suitable for steel are not necessarily acceptable for coating neodymium magnets. For example, most metal platings are sacrificial with respect to the base material but neodymium, due to its high activity level, will actually sacrifice itself to protect the plating.

It has been found that known electroplated coatings, including cadmium or nickel plating, do not provide adequate corrosion protection. Indeed, in some cases such plating processes actually contribute to corrosion problems.

A further problem is present when neodymium-boron-iron magnets are used in motor field assemblies since this magnetic material possesses a negative coefficient of thermal expansion in the plane perpendicular to the axis of magnetic orientation. Since motor assemblies must operate over a wide thermal range, the magnet can experience thermal expansion far different than the substrate, usually iron, to which it is attached. The effects of corrosion and thermal expansion have been found to cause neodymium-boron-iron magnets to break loose from the motor field assembly as the motor is temperature cycled. In such cases, the corroded magnets simply cannot withstand the large difference in thermal expansion between the magnetic material and the field assembly substrate. Since the corroded magnet surface layer can no longer support the large stress gradient at the bond interface, the magnet fractures along the bond surface and is lost within the motor. Naturally, this detracts from or inhibits motor performance.

Therefore, it is one object of the present invention to provide adequate corrosion protection for neodymium-boron-iron magnets and motor field assemblies. It is another object to prevent such magnets from breaking loose in motor field assemblies.

These and other highly desirable and unusual results are accomplished in accordance with the present invention in a reliable, cost-effective manner so that the full advantages of neodymiun-boron-iron magnets may be realized.

Objects and advantages of the invention are set forth in part herein and in part will be readily appreciated herefrom, or may be learned by practice with the invention, the same being realized and attained by means of the instrumentalities and combinations pointed out in the appended claims.

SUMMARY OF THE INVENTION

In accordance with the present invention, neodymiun-boron-iron magnets are treated in and coated with solutions which neutralize the surface effects of any contaminants, e.g., free chlorine ions. The preferred neutralizing solutions are incorporated in a zinc phosphate process. Advantageously, the preferred zinc phosphate process not only neutralizes corrosion effects but also coats the magnet to form a surface which is very receptive to coatings and adhesives. Indeed, the zinc phosphate coating increases surface area and provides extensive sites for mechanical interlocking of coatings and/or adhesives.

An adhesive is used to bond the properly cleaned, zinc phosphate-coated magnet surface to a substrate. A flexible adhesive is used for bonding the coated magnet to a clean motor field substrate such as an iron stator assembly. Advantageously, the flexible adhesive forms a strong bond with the zinc phosphate-treated magnet while also accommodating the great difference between the thermal expansion characteristics of the magnet and substrate.

In the preferred embodiment a further coating layer of a durable, corrosion-resistant material is applied to the entire magnet or is applied to the exposed surfaces of the coated magnet, i.e., the surfaces other than the bonding surface. Surprisingly, a coating of an amide imide or a specially formulated zinc-rich or chromium-rich epoxy primer has been found to be particularly useful in imparting additional corrosion resistance. This layer may be applied to the coated magnet by brushing or spraying. If the magnet is to be bonded to a substrate, generally care should be taken to avoid application of the coating to the bonding surface. Alternatively, this coating may be applied after the magnet has been bonded to the substrate, eliminating the need to mask or otherwise protect the bonding surface. However, application of the adhesive over the special epoxy primers may be possible.

The method of the present invention remarkably provides a neodymium-boron-iron magnet assembly capable of enduring exposure to a corrosive environment and a magnet assembly capable of enduring the wide variation in temperatures and corrosive chemicals found in the environment of motor field assemblies. Surprisingly, this remarkable result is obtained in a straight-forward and effective manner by treating the magnet in a zinc phosphate neutralizing solution in order to neutralize corrosive effects on the magnet surface and form a protective coating having a surface receptive to adhesives and/or coatings. Advantageously, the coated magnet surface attains a high degree of mechanical interlocking with the adhesive used to bond the magnet to the substrate. Remarkably, when a flexible adhesive is used, the adhesive retains sufficient flexibility in a motor field assembly to withstand and compensate for the great stress resulting from the difference in thermal expansion coefficients of the magnet and substrate.

BRIEF DESCRIPTION OF THE DRAWING

The accompanying drawing labelled FIG. 1, referred to herein and constituting a part hereof, illustrates in enlarged cross section a motor field assembly in accordance with one embodiment of the invention.

DESCRIPTION OF THE PREFERRED EMBODIMENTS

Figure 1:
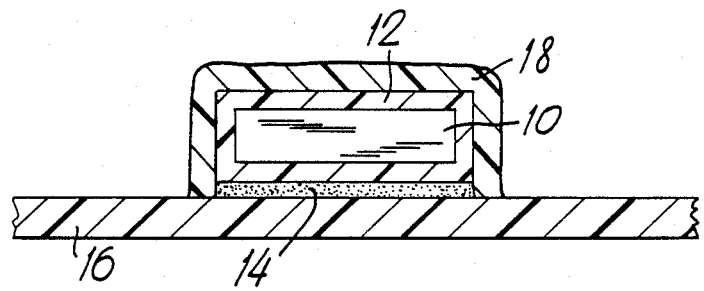

In accordance with the preferred method of the present invention, neodymium-boron-iron magnets are treated and coated in a zinc phosphate solution. Thereafter, a durable corrosion-resistant coating layer may be applied to provide further corrosion protection.

Neodymium-boron-iron magnets may be received in block form and thereafter cut into desired sizes and configurations. Such magnets may be magnetized or unmagnetized during processing in accordance with the present invention, and it should be understood that reference herein to "magnets" is for convenience only and should not be construed as a limitation on the present invention.

In accordance with the preferred embodiment the magnet is cleaned and treated to neutralize the corrosive surface effects of contaminants, e.g., any free chlorine ions. In practice, the magnet is cleaned by successive treatments in an alkaline bath, a water rinse, a sulfuric acid bath and a second water rinse.

At present, the preferred alkaline bath is prepared with 5 to 7 ounces of Oakite No. 195 per gallon of water and 3 to 5 ounces of Oakite No. 90 per gallon of water. Both products are available from Oakite Products, Inc., Berkeley Heights, N.J. Oakite 195 is an inhibited alkaline, reverse current electrocleaner for zinc and other metals. It is a moderately hygroscopic white powder with no odor, a bulk density of 1152 g./l. and a maximum solubility of 90 g./l. at 21° C. It precipitates in hard water. The pH is 13.0 to 13.2 at working concentrations of 37.5 to 60 g./l. of water. Oakite 90 is a powdered alkaline material designed to anodically remove smut, oil and other shop soils from steel and copper prior to plating. It is a blend of anionic and nonionic surfactants and alkalies including caustic soda, silicates and phosphates. It is a hygroscopic white powder with a faint aromatic order. Its maximum solubility is up to 60 g./l. at 21° C. and 120 g./l. at 82° C. It flocculates in hard water. The pH is 13.2 at working concentrations of 45 g./l at 21° C. The cleaning process is effected by rinsing the magnet for 10–15 seconds in water at tap temperature, e.g., approximately 13° C. (55° F.) (hereinafter referred to as a "cold water rinse"), and immersing the magnet in the alkaline bath. The magnet in the alkaline bath is held cathodic for 5 to 10 seconds and switched to anodic for 5 to 10 seconds.

Thereafter, the magnet is given a cold water rinse for 10 to 15 seconds and immersed in sulfuric acid, e.g., approximately 0.7 molar, for about 5 seconds. The magnet is then given another cold water rinse for 10–15 seconds.

Thus cleaned, the magnet is in condition for treatment in the zinc phosphate neutralizing and coating solution. This treatment neutralizes the surface effects of contaminants, protects the magnet, and/or forms a coated surface receptive to bonding agents and coatings. The zinc phosphate neutralizing solution contains approximately 4% to 5% by volume zinc phosphate and is maintained at an elevated temperature in the range of 190° to 205° F. During processing the magnet material is immersed in the neutralizing and coating solution for approximately 15 to 30 minutes.

The preferred zinc phosphate solution is made from "Cryscoat ZS 400" available from Oakite Products, Inc., Berkeley Heights, N.J. It is prepared as a "heavy" coating solution (e.g., 600 to 4,500 mg./ft.$^2$) which contains nitric acid, hydrofluoric acid and heavy metal phosphates. It is a light green solution with an acid odor, a specific gravity of 1.423 at 20° C. (ASTM 1298), bulk density of 1423 g./l at 20° C., and viscosity at 20° C. of 9–10 cps. (Brookfield Spindle 1 at 60 rpm).

The neutralized and coated magnet is given a cold water rinse for about one minute. Preferably, the coated magnet is then immersed in an acidified rinse containing, for example, approximately 20% chromic acid and 0.4 fluid ounces nitric acid per gallon. The acidified rinse has a pH of 0.8 to 2.0 and is maintained at 15°–43° C. (60° to 110° F). Preferably, the coated magnet remains in the acidified rinse for 5 to 30 seconds. One appropriate acidified rinse is "Iridite 8P Blubrite" (available from the Allied Kelite Division of Richardson Co., Des Plaines, Ill.) which is a concentrated powder containing chromium compounds that is mixed with water and nitric acid to make a working solution. After the acidified rinse the magnet is given a warm water rinse (100° C. to 110° F.) and is dried, yielding a zinc phosphate coated magnet.

In accordance with one embodiment, the zinc phosphate-coated magnet is further protected against corrosion by the application of a uniform coating of a polyamide imide (hereafter referred to as amide imide) wire enamel or a specially formulated zinc-rich or chromium-rich epoxy layer to the clean zinc phosphate-coated magnet.

A suitable amide imide wire enamel is available from P. D. George Company of St. Louis, Mo. or United Technologies Essex Group, Magnet Wire and Insulation Division of Fort Wayne, Ind. It is an amber, dark olive liquid having a solids content of about 16–18%, weight of about 8.3–8.7 lb./gal., and Brookfield viscosity at 25° C. of about 350–450 cps. (#2 spindle at 30 RPM). The enamel is thinned with N-methyl pyrrolidone (NMP) as necessary for application by spraying or coating. Preferably, the additional protective coating is applied to zinc phosphate coated magnets preheated at °C. (150° F.) for 7–10 minutes. The magnets are rewarmed at about 60°–71° C. (140°–160° F.) until the surface is no longer shiny. If necessary, multiple coatings may be applied after a wait of about 5–7 minutes. The amide imide coated magnets are heated for about 10–15 minutes at about 60°–71° C. (140°–160° F.) prior to the final cure. The baking procedure involved in the final cure typically consists of 20–30 minutes at 87°–99° C. (190°–210° F.), followed by 70–110 minutes at 143°–154° C. (290°–310° F.), followed by at least 1.5 hours, but not more than 2.5 hours, at 171°–182° C. (340°–360° F.).

A suitable epoxy primer (about 60% solids) contains encapsulated zinc or chromium salts (e.g., strontium chromate) and is available from Premium Finishes of Cincinnati, Ohio under the number PF-300-011. Equal volumes of the thoroughly stirred two part epoxy primer are mixed thoroughly. If necessary for application, the mixture is thinned with methyl ethyl ketone. The coating thickness will depend upon the application method used. Typically, the coating is brushed on. The primer should air dry in about 10 minutes and is recoatable in about 30 minutes. Accelerated curing for about 10-20 minutes at about 65°-91° C. (150°-195° F.) may be used if desired.

It may be possible to provide sufficient corrosion resistance by application of only the zinc-or chromium-rich epoxy coatings. However, with the amide imide coating precoating with zinc phosphate is required.

In accordance with another embodiment the zinc phosphate-coated magnet or zinc phosphate-, amide imide-or epoxy-coated magnet is bonded to a substrate with an adhesive. In the preferred embodiment it is bonded to a motor field assembly substrate, e.g., an iron stator, using a flexible epoxy adhesive. The flexible epoxy adhesive should have a broad effective operating temperature corresponding to the temperature cycle which will be experienced during motor operation and must be compatible with the materials to be bonded. The preferred flexible adhesive is "Scotchweld 2214 Hi-flex epoxy" available from Minnesota Mining and Manufacturing, Minneapolis, Minn. Hi-Flex 2214 is a one-part, 100% solids, aluminum-filled heat curing structural adhesive. It has an approximate viscosity of 20 seconds (to deliver 2 @ g. @ 50 psi thru a 0.104" orifice) and a consistency of a non-sag paste. It cures in 40 min. @ (250° F.), 10 min. @ (300° F.) and 5 min. at (350° F.). The optimum bond line thickness is 2-5 mils. Its overlap shear strength ASTM D-1002-64 ranges from 2500 psi to aluminum FPL Etch and 3500 psi to steel solvent wipe at −67° F. to 250 psi to aluminum FPL etch and 125 psi to steel solvent wiped at 350° F. Its T-Peel strength ASTM D-1867-61T is 10 piw for aluminum FPL etch and 65 piw for steel solvent wipe for 75° F. (using a hot press cure for 40 min. @ 250° F., 25 psi). This epoxy has a desirable effective operating temperature which ranges from about −75° F. to over 300° F. Of course, the surfaces to be bonded must be clean and free of all grease. In practice, ethyl alcohol has proven effective for cleaning the zinc coated magnet surface and the substrate surface prior to application of the flexible adhesive.

Due to the relatively large surface area and numerous mechanical interlocking sites of the zinc phosphate coating the flexible epoxy forms a strong bond between the coated magnet surface and the substrate. Advantageously, however, the flexible adhesive accommodates the difference between the coefficients of thermal expansion for the substrate and magnet material. The combination of the strong bonds formed with each surface, together with the flexibility of the adhesive, enables the system to withstand the great stresses experienced during thermal expansion and/or contraction of the materials.

It is contemplated that shaping may be necessary to conform the magnets to the desired motor shape. This may be accomplished by grinding the magnets. As in the case of magnetization, this step may be performed either before or after the magnets are bonded to the stator. For convenience, it is here assumed that the magnets are shaped after bonding to the stator. Care must be taken to prevent overheating of the magnets during grinding, but it is also important to minimize exposure to any chlorine-containing coolants.

Assuming that the magnets have been shaped by grinding, at least a portion of the zinc phosphate coating will be damaged or destroyed. Therefore, it is necessary to selectively reapply the zinc phosphate neutralizing treatment and coating to the shaped magnet. Where the magnet is ground prior to bonding the magnet might simply be treated using the immersion technique and related rinses previously described. Where the magnet is ground while attached to the stator it has been found convenient to selectively reapply the zinc phosphate coating using a brush or spray technique. In practice, the ground magnet surface is rinsed in warm water and cleaned with ethyl alcohol prior to application of the zinc phosphate at an elevated concentration on the order of 10% by volume Cryscoat. An elevated concentration has been used to compensate for the apparently shorter solution contact time attained using brush or spray rather than immersion coating techniques. However, experience with the invention may reveal that the higher solution concentration is unnecessary. After reapplying the zinc phosphate, the cold water and acidified rinses are applied, also using a brush or spray technique. The treated magnet is then air dried.

The magnets treated, coated and bonded to the substrate in this manner are effectively protected from corrosion and the stresses of thermal expansion and, in many applications, may be used in this state. However, as an added measure of protection it has been found desirable to apply a layer of a durable, corrosion-resistant material over the exposed surfaces of the zinc phosphate-coated magnets. Advantageously, the relatively large surface area and numerous mechanical interlocking sites of the zinc phosphate coated surfaces render those surfaces very receptive to such a coating. In accordance with this aspect of the invention it has been found that amide imide performs surprisingly well as a corrosion inhibitor and is sufficiently durable to withstand harsh motor environments. One acceptable amide imide material is "981 Tritherm amide imide" available from P. D. George Co. of St. Louis, Mo. Preferably, the receiving surfaces are preheated to a temperature in excess of 93° C. (200° F. prior to application. Brush or spray techniques may be used to obtain a coating having a desired thickness in the range of 0.5 to 1.5 mils.

The structure of the motor field assembly obtained with the foregoing process will now be described with reference to FIG. 1, an enlarged cross-sectional view of the motor assembly structure illustrating all layers and coatings. As there shown, magnet 10 is coated with the neutralizing and coating agent 12 and the flexible adhesive 14 bonds the coated-magnet to the substrate 16. In the preferred embodiment a durable, corrosion resistant coating layer 18 covers the exposed surfaces of the coated magnet. More specifically, a neodymium-boron-iron magnet 10 has a zinc phosphate coating 12 and is bounded to an iron stator assembly 16 by a flexible epoxy adhesive 14. The exposed zinc phosphate-coated surfaces are preferably coated with an amide imide or a chromate or zinc rich epoxy primer coating layer 18.

It will readily be appreciated that numerous variations from the refinements to the foregoing description may be made without departing from the principles of the invention or sacrificing its chief advantages. In particular, all concentrations, times and techniques are provided by way of example only and should not be construed as requirements for practicing the invention.

Indeed, numerous variations thereof will be readily apparent to those of ordinary skill in the art.

In addition, the particular order of processing steps is not critical and may be varied depending upon preference and/or manufacturing considerations. By way of example, in accordance with the preferred embodiment it is contemplated that magnets might be cleaned, treated and coated with zinc phosphate, bonded to the stator substrate, ground to the desired configuration, touched-up with zinc phosphate, magnetized, and coated with amide imide in that order. Alternatively, it is contemplated that the magnets could be ground and magnetized prior to any processing, thereby eliminating any need for the zinc phosphate touch-up. It is also contemplated that the magnets might be ground, touched-up with zinc phosphate and coated with amide imide on all but the bonding surface prior to bonding the magnet to the substrate.

These and numerous other variations of the invention will be readily apparent to a person of ordinary skill in the art by reading the foregoing description of the invention or may be learned by practice with the invention, all within the scope the appended claims. Therefore, the foregoing description should be considered as exemplary and explanatory of the invention and should not be viewed as limiting the scope of the invention as set forth in the claims.

What is claimed is:

1. A method of protecting a neodymium-boron-iron magnet from corrosion, which comprises the steps of:
   (a) coating the cleaned magnet with a zinc phosphate-containing solution to form a protective layer of zinc phosphate to neutralize corrosion surface effects; and
   (b) rinsing the zinc phosphate-coated magnet with a chromic acid-containing solution.

2. The method according to claim 1, further comprising the step of cleaning the neodymium-boron-iron magnet in an alkaline solution prior to the coating step of (a).

3. The method of claim 2, further comprising the step of rinsing the magnet for about 10–15 seconds in water at about 13° C. (about 55° F.) after cleaning in the alkaline solution.

4. The method of claim 2, wherein the alkaline solution is a bath in which the magnet is maintained cathodic for about 5 to 10 seconds and then switched to and maintained anodic for about 5 to 10 seconds.

5. The method according to claim 2, further comprising the steps of rinsing the cleaned magnet in water, then in an acidified rinse, and finally in water after the alkaline cleaning step and prior to the coating step of (a).

6. The method of claim 5, wherein the cleaned magnet is rinsed in cold water for about 10 to 15 seconds before the acid rinse, wherein the acid rinse is carried out by immersion in about 0.7 molar sulfuric acid for about 5 seconds, and wherein the final water rinse is carried out for about 10–15 seconds in cold water.

7. The method of claim 3, wherein the coating is carried out by immersion for about 10–15 minutes in the solution containing about 4–5% by volume of zinc phosphate, the solution being maintained at about 88°–96° C. (190°–205° F.).

8. The method of claim 7, wherein the coating solution is a heavy coating solution capable of depositing about 600–4500 milligrams of zinc phosphate per square foot.

9. The method of claim 7, wherein the chromic acid rinse is carried for about 5 to 30 seconds at a pH of about 0.8 to 2.0 using a solution containing about 20% chromic acid and about 0.4 fluid ounces of nitric acid per gallon.

10. The method of claim 9, further comprising the step of rinsing the magnet with water at about 38°–43° C. (100°–110° F.) after the chromic acid rinse.

11. The method of claim 10, further comprising the step of drying the magnet.

12. The method according to claim 11, further comprising the step of applying a durable, corrosion-resistant layer to one or more surfaces of the magnet.

13. The method of claim 12, wherein the step of applying the corrosion-resistant layer is carried out with an amide imide or an epoxy primer containing encapsulated zinc or chromium.

14. The method of claim 11, further comprising the steps of grinding the magnet, cleaning the ground magnet, and reapplying a zinc phosphate-containing solution by brushing or spraying.

15. The method of claim 14, wherein the coating solution contains about 10% by volume zinc phosphate and wherein the ground magnet is cleaned by rinsing in warm water and then with ethyl alcohol.

16. A method of making a motor field assembly including at least one neodymium-boron-iron magnet comprising the steps of:
   (a) cleaning the magnet in an alkaline solution;
   (b) rinsing the cleaned magnet in water, then in an acidified rinse, and finally in water;
   (c) coating the cleaned, rinsed magnet with, a zinc-phosphate-containing solution to form a protective zinc phosphate layer to neutralize corrosive surface effects;
   (d) rinsing the coated magnet in water and then in a chromic acid containing solution; and
   (e) drying the rinsed, coated magnet; and
   (f) bonding the dried, rinsed, coated magnet to a motor field assembly substrate with a flexible epoxy adhesive having an operating range of from about −17° C. to over 149° C. (−75° F. to over 300° F.).

17. The method according to claim 16, wherein the coating of step (c) is carried out by immersion in zinc phosphate-containing solution which contains approximately 4–5% by volume zinc phosphate solution.

18. The method according to claim 17, further comprising the step of applying a durable, corrosion resistant layer to all surfaces of said coated magnets other than the surface to be bonded to said substrate.

19. The method according to claim 18, wherein said durable, corrosion resistant layer is amide imide or an epoxy primer containing encapsulated zinc or chromium.

20. The method of claim 19, further comprising the step of cleaning the surface of the dried magnet and the surface of the substrate with a solvent which removes grease prior to the bonding of step (f).

21. The method of claim 20, wherein the cleaning is carried out with ethyl alcohol.

22. The method of claim 16, further comprising the steps of grinding the bonded magnet, cleaning the ground magnet, and reapplying a coating of a zinc phosphate-containing solution by brushing or spraying.

23. The method of claim 22, wherein the ground magnet is cleaned by rinsing in warm water and then with ethyl alcohol and wherein the coating solution contains about 10% by volume of zinc phosphate.

24. A motor field assembly comprising a motor field assembly substrate; at least one neodymium-boron-iron magnet cleaned and then coated in a zinc phosphate-containing solution to form a zinc phosphate protective layer to neutralize corrosive surface effects; and an adhesive layer of a flexible epoxy adhesive having an operating range of from about −17° C. to over 149° C. (−75° F. to over 300° F.) bonding said coated magnet to said substrate.

25. The assembly according to claim 24, further comprising a protective layer covering all exposed surfaces of said coated magnet other than the surface to be bonded to said substrate.

26. The assembly according to claim 25, wherein said protective layer covering all exposed surfaces other than surface to be bonded to said substrate comprises an amide imide coating or a zinc rich or chromium rich epoxy primer.

27. The assembly according to claim 24, wherein the substrate is a stator and wherein the magnet is ground while attached to the stator, further comprising the step of reapplying a coating of a zinc phosphate-containing solution by brushing or spraying.

28. The assembly according to claim 27, wherein the stator is an iron stator and wherein the coating solution contains about 10% by volume of zinc phosphate.

* * * * *